US010482854B1

(12) United States Patent
Freer

(10) Patent No.: US 10,482,854 B1
(45) Date of Patent: Nov. 19, 2019

(54) HYBRID SNARE DRUM STICK

(71) Applicant: Thomas C. Freer, Cleveland Heights, OH (US)

(72) Inventor: Thomas C. Freer, Cleveland Heights, OH (US)

(73) Assignee: Freer Precussion LLC, Cleveland Heights, OH (US)

( * ) Notice: Subject to any disclaimer, the term of this patent is extended or adjusted under 35 U.S.C. 154(b) by 0 days.

(21) Appl. No.: 16/350,294

(22) Filed: Oct. 29, 2018

(51) Int. Cl.
*G01D 13/02* (2006.01)
*G10D 13/00* (2006.01)

(52) U.S. Cl.
CPC .................................. *G10D 13/003* (2013.01)

(58) Field of Classification Search
CPC .................................................... G10D 13/003
See application file for complete search history.

(56) References Cited

U.S. PATENT DOCUMENTS 2,485,823 A * 10/1949 Goldrich .............. G10D 13/003 84/422.4
2,521,336 A * 9/1950 Bramson .............. G10D 13/003 482/93
2,728,257 A * 12/1955 Pochobradsky ......... A46B 9/08 84/422.4
2,905,043 A * 9/1959 Soderberg ............ G10D 13/003 84/404
3,665,799 A * 5/1972 Hinger ................. G10D 13/003 84/422.1
4,385,544 A * 5/1983 Heiskell ............... G10D 13/003 84/422.4
5,044,250 A * 9/1991 Beyer .................. G10D 13/003 84/422.4
5,179,237 A * 1/1993 Grossman ............ G10D 13/003 84/422.4
5,244,445 A * 9/1993 Amesquita ............. A63B 15/00 482/109
5,265,514 A * 11/1993 Schertz ................ G10D 13/003 446/419
5,341,716 A * 8/1994 Donohoe ............. G10D 13/003 84/422.4
6,162,979 A * 12/2000 Gauger ................ G10D 13/003 84/402
6,310,278 B1 * 10/2001 Butler .................. G10D 13/003 84/422.4

(Continued)

FOREIGN PATENT DOCUMENTS

DE 102015120677 A1 * 6/2016 ........... G10D 13/003

*Primary Examiner* — Robert W Horn
(74) *Attorney, Agent, or Firm* — Calfee, Halter & Griswold LLP

(57) ABSTRACT

An improved drum stick for use with all types of musical percussion instruments is disclosed. "Hybridized" wood materials are used for two sections or portions of the drum stick. The body or middle section of the drum stick is fabricated from a woven carbon fiber tube which is connected to a tip section or portion of the drum stick and its oppositely disposed butt section or portion of the drum stick, both of which are fabricated from a laminate wood composite material, known as hornwood. The combination of the woven carbon fiber tube with the tip section and its oppositely disposed butt section fabricated from hornwood results in a drum stick that has a precise pitch and weight while producing a very fast "rebound" off of the drum head.

20 Claims, 2 Drawing Sheets

(56) References Cited

U.S. PATENT DOCUMENTS

| | | | | |
|---|---|---|---|---|
| 6,759,583 | B2 * | 7/2004 | Mizuno | G10D 13/003 84/422.4 |
| 7,868,237 | B1 * | 1/2011 | Quilon | G10D 13/003 84/422.4 |
| 8,981,194 | B2 * | 3/2015 | Grossman | G10D 13/003 84/422.4 |
| 8,987,569 | B2 * | 3/2015 | Huber | G10D 13/003 84/422.4 |
| 9,837,057 | B1 * | 12/2017 | Jespersen | G10D 13/06 |
| 10,269,333 | B1 * | 4/2019 | Vater | G10D 13/003 |
| 2004/0231493 | A1 * | 11/2004 | Milne | G10D 13/003 84/422.4 |

* cited by examiner

HYBRID SNARE DRUM STICK

TECHNICAL FIELD

The present invention relates, in general, to a drum stick for use with all types of musical percussion instruments and, more particularly, to a drum stick fabricated from a unique combination of materials in order to create a unique response, tone, and feel to the percussionist.

BACKGROUND ART

Drum sticks and, in particular, snare drum sticks are typically fabricated from wood or other materials, such as aluminum or wood laminates (woods comprising a plurality of thin wooden plies that are pressure treated with resin, glue and color). Snare drum sticks are comprised of four main sections or portions which comply with industry standards with respect to design and manufacturing. These four sections or portions of such drum sticks are the tip, the shoulder, the body or middle section, and the butt end. Each section or portion of the drum stick has a particular shape which affects the feel and response of the drum stick to the percussionist. There are innumerable possibilities as to the shape of the aforementioned sections or portions of the drum stick. For many years snare drum sticks have incorporated a nylon tip on the end of the drum stick in order to produce a harder and clearer sound on drums and cymbals and to increase the longevity and durability of the tip. Wooden drum sticks are typically of the "throw away" type and are readily discarded. Such wooden drum sticks are inexpensive to produce and may last only several weeks to a month depending on how much and how hard they are used. The response and feel of such wooden drum sticks is dependent on the pitch and weight of the drum stick. If the drum stick is of a high pitch and a particular weight, it will bounce off of a drum quickly producing an excellent tone. If the pitch of the drum stick is too low and its weight is too light, it will bounce off of the drum slowly and will vibrate in the hands of the percussionist producing a dull and inferior tone and will absorb too much vibration from the drum head. The foregoing typically occurs with about 90% of the mass produced wooden drum sticks; only 10% of the wooden mass produced drum sticks will be of a pitch and weight range that are desirable.

In view of the foregoing, it has become desirable to develop an improved drum stick that is more durable than presently available drum sticks fabricated from wood, aluminum or wood laminates, will have a high natural pitch, will rebound off the drum extremely quickly, and will possess a perfect and consistent weight range. Such a drum stick will provide significant benefits to the percussionist in terms of increased hand speed, tone quality, and sound production.

SUMMARY OF THE INVENTION

The present invention solves the problem associated with the prior art drum sticks and achieves the aforementioned desirable attributes of superior playing response and sound production, while enabling the manufacturer of the drum sticks to fabricate the sticks in an extremely consistent manner. The foregoing is accomplished by "hybridizing" wood materials for use within two sections or portions of the drum stick of the present invention. The remaining middle section of the drum stick of the present invention is fabricated from a woven carbon fiber tube (or extruded carbon fiber or other material) and interconnects the tip section or portion of the drum stick and its oppositely disposed butt section or portion, both of which are fabricated from a laminate wood composite material, known as hornwood. The combination of the woven carbon fiber tube with the tip section and its oppositely disposed butt section, both formed from hornwood, results in a drum stick that has a precise pitch and weight while producing a substantially faster rebound off of the drum head as compared to the rebound properties of presently available drum sticks, whether fabricated from wood or another material.

DESCRIPTION OF THE PREFERRED EMBODIMENT

Figure 1:
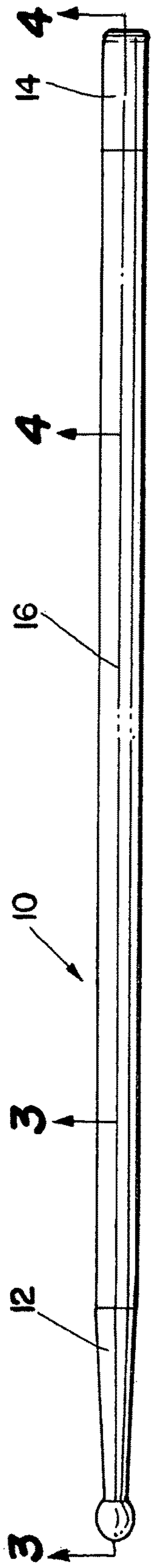
FIG. 1 is a front elevational view of a single ended embodiment of the drum stick of the present invention and illustrates the tip section or portion of the drum stick, the body or middle section or portion of the drum stick, and the butt section or portion of the drum stick.
Figure 3:
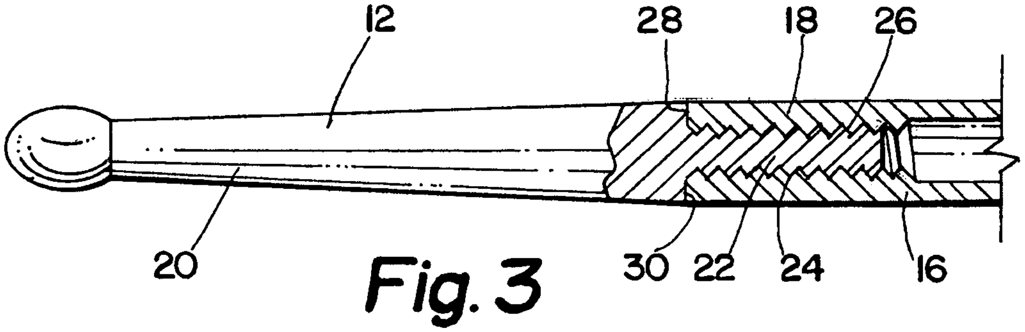
FIG. 3 is a cross-sectional view of the present invention taken across section-indicating lines 3-3 in FIG. 1.
Figure 4:
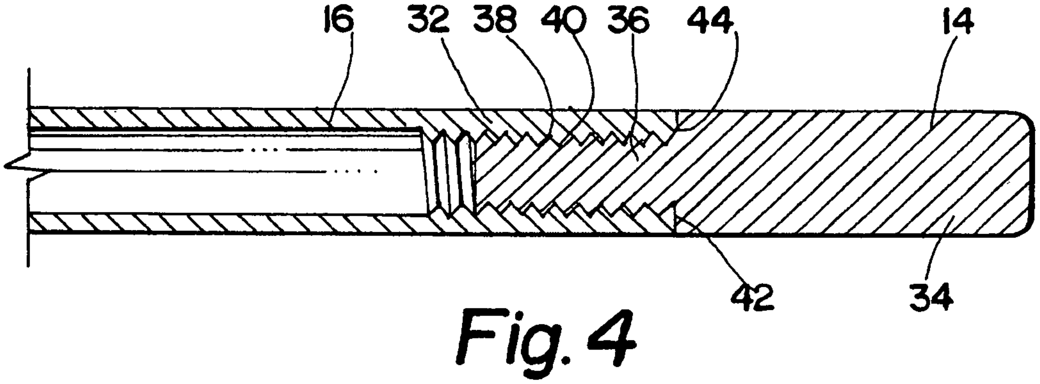
FIG. 4 is a cross-sectional view of the present invention taken across section-indicating lines 4-4 in FIG. 1.

Referring now to the drawings where the Figures are for the purpose of describing the preferred embodiment of the present invention and are not intended to limit the invention described herein, FIG. 1 is a front elevational view of a single ended embodiment of the drum stick 10 of the present invention. The drum stick 10 is comprised of a tip section or portion 12, an oppositely disposed butt section or portion 14, and a middle section or portion 16 interposed therebetween. The tip section 12 and the butt section 14 are fabricated from hornwood which is a densified, resin impregnated hardwood composite material. The middle section 16 is fabricated from a woven carbon fiber tube (or extruded carbon fiber or other materials). Referring now to FIG. 3, which is a cross-sectional view of the present invention taken across section-indicating lines 3-3 in FIG. 1, this Figure shows the attachment of the tip section 12 to the end 18 of the middle section 16. The tip section 12 is comprised of a body portion 20 which terminates in a projection 22 having male threads 24 formed thereon. The end 18 of the middle section 16 has female threads 26 formed therein. Projection 22 on tip section 12 is threadably received within end 18 of the middle section 16 until shoulder 28 on tip section 12 firmly engages shoulder 30 on end 18 of middle section 16 providing a firm attachment of tip section 12 to the end 18 of the middle section 16 of the drum stick 10. After the tip section 12 is firmly attached to the end 18 of middle section 16, epoxy is applied to the joint therebetween creating a mechanical and chemical bond between the tip section 12 and the middle section 16 of the drum stick 12. Referring now to FIG. 4, which is a cross-sectional view taken across section-indicating lines 4-4 in FIG. 1, this Figure shows the attachment of butt section 14 to the oppositely disposed end 32 of the middle section 16. The butt section 14 is comprised of a body portion 34 which terminates in a projection 36 having male threads 38 formed thereon. The oppositely disposed end 32 of the middle section 16 has female threads 40 formed therein. Projection 36 on butt section 14 is threadably received within end 32 of the middle section 16 until shoulder 42 on butt section 16 firmly engages shoulder 44 on end 32 of middle section 16 providing a firm attachment of butt section 14 to end 32 of the middle section 16 of the drum stick 10. After the butt section 14 is firmly attached to the end 32 of middle section 16, epoxy is applied to the joint therebetween creating a mechanical and chemical bond between the butt section 14 and the middle section 16 of the drum stick 10. A longitudinally extending through bore (not shown) is provided in the butt section 14 permitting air to escape during the assembly process.

It should be noted that the length of each and/or all of these sections (tip section 12, middle section 16, and butt section 14) can be varied in order to produce a longer or shorter drum stick. In addition, the shape of the tip section 12 and/or the butt section 14 can be formed into numerous shapes and designs in order achieve particular sounds and/or responses. For example, a very small 5×5 mm ball shaped tip can be used to produce a drum stick used for soft delicate playing while a larger 12×12 mm ball shaped tip can be used for marching band drums. The butt section 14 can also be formed in various lengths and shapes in order to improve response.

Figure 2:
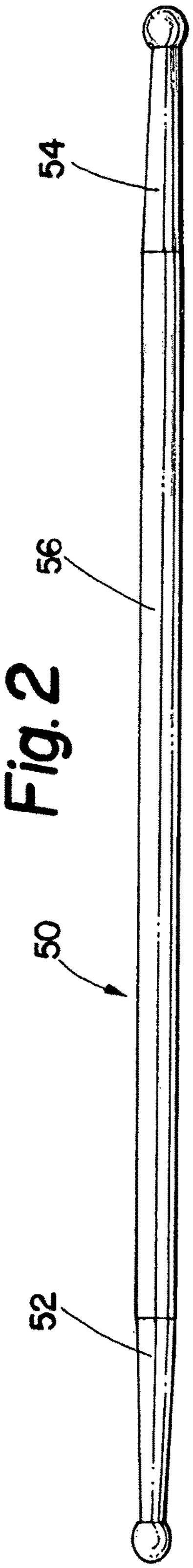
FIG. 2 is a front elevational view of a double ended embodiment of the drum stick of the present invention.

Referring now to FIG. 2, a front elevational view of a double ended embodiment of the drum stick 50 of the present invention is illustrated. In this embodiment of the present invention, the drum stick 50 is comprised of a tip section or portion 52, an oppositely disposed tip section or portion 54, and a middle section or portion 56 interposed therebetween. Both tip sections 52, 54 are fabricated from hornwood, while the middle section 56 is formed from a woven carbon fiber tube. The tip sections 52, 54 are attached to the respective oppositely disposed ends of the middle section 56 in the same manner as previously described herein for the single ended embodiment of the drum stick 10 of the present invention. In the structure shown in FIG. 2, the size of a tip section 52, 54 can be different from the size of its oppositely disposed tip section enabling the percussionist to flip the drum stick 50 over during a performance allowing the percussionist to need only one set of drum sticks during a performance.

It should be noted that in both of the embodiments of the present invention described herein, the hornwood material can be fabricated to resemble the aesthetic appearance of natural wood, such as ebony, cocobolo, rosewood, etc., while being environmentally friendly since the thin plies of wood used in the manufacture of hornwood are typically made from sustainable birch or maple wood. These plies of wood are then colored, heat treated with a resin, and then pressure treated to create a processed laminated wood that is harder and more durable than even lignum vitae, which is one on the hardest woods known, Certain modifications and improvements will occur to those skilled in the art upon reading the foregoing. It is understood that all such modifications and improvements have been deleted herein for the sake of conciseness and readability but are properly within the scope of the following claims.

I claim:

1. A drum stick for use by a percussionist comprising a first end section that includes a first threaded portion, a second end section that includes a second threaded portion, and a middle section interposed between and connected to the first end section and to the second end section, wherein the middle section is connected to the first threaded portion of the first end section and to the second threaded portion of the second end section by a threaded connection, wherein the first end section and the second end section are fabricated from a wood laminate material, and wherein the middle section is formed from a woven carbon material.

2. The drum stick according to claim 1, wherein the second end section is oppositely disposed to the first end section.

3. The drum stick according to claim 1, wherein the first end section is formed into a tip portion of the drum stick.

4. The drum stick according to claim 1, wherein the second end section is formed into a butt portion of the drumstick.

5. The drum stick according to claim 1, wherein the first end section and the second end section are each formed into a tip portion of the drum stick.

6. The drum stick according to claim 1, wherein the middle section comprises a hollow tube.

7. The drum stick according to claim 6, further comprising a bore that extends from the hollow tube of the middle section to an outer surface of the second end section to allow air to escape during assembly.

8. The drum stick according to claim 1, wherein the first end section comprises a first set of male threads, wherein the second end section comprises a second set of male threads, wherein the middle section comprises a first set of female threads for receiving the first set of male threads of the first end section, wherein the middle section comprises a second set of female threads for receiving the second set of male threads of the second end section.

9. The drum stick according to claim 1, further comprising a first epoxy that creates a bond between the first and section in the middle section, and a second epoxy that creates a bond between the second end section in the middle section.

10. A drum stick for use by a percussionist comprising a first end section that includes a first threaded portion, a second end section that includes a second threaded portion, and a middle section interposed between and connected to the first end section and to the second end section, wherein the middle section is connected to the first threaded portion of the first end section and to the second threaded portion of the second end section by a threaded connection, and wherein the middle section comprises a carbon fiber material.

11. The drum stick according to claim 10, wherein the first end section and the second end section are fabricated from a wood laminate material.

12. The drum stick according to claim 10, wherein the first end section comprises a first set of male threads, wherein the second end section comprises a second set of male threads, wherein the middle section comprises a first set of female threads for receiving the first set of male threads of the first end section, wherein the middle section comprises a second set of female threads for receiving the second set of male threads of the second end section.

13. The drum stick according to claim 10, further comprising a first epoxy that creates a bond between the first and section in the middle section, and a second epoxy that creates a bond between the second end section in the middle section.

14. The drum stick according to claim 10, wherein the middle section comprises a hollow tube.

15. The drum stick according to claim 14, further comprising a bore that extends from the hollow tube of the middle section to an outer surface of the second end section to allow air to escape during assembly.

16. The drum stick according to claim 10, wherein the first end section is formed into a tip portion of the drum stick, wherein the second end portion is formed into a butt portion of the drumstick.

17. The drum stick according to claim 10, wherein the first end section and the second end section are each formed into a tip portion of the drum stick.

18. The drum stick according to claim 17, wherein the middle section is connected to the first end section and to the second end section by a threaded connection.

19. The drum stick according to claim 17, further comprising a first epoxy that creates a bond between the first and section in the middle section, and a second epoxy that creates a bond between the second end section in the middle section.

20. A drum stick for use by a percussionist comprising a first end section, a second end section, a middle section that includes a hollow tube that is interposed between and connected to the first end section and the second end section, and a bore extending from the hollow tube of the middle section to an outer surface of the second end section to allow air to escape during assembly, wherein the first end section and the second end section are fabricated from a wood laminate material, and wherein the middle section is formed from a woven carbon material.

* * * * *